(12) United States Patent
Lodwig et al.

(10) Patent No.: US 8,130,136 B2
(45) Date of Patent: Mar. 6, 2012

(54) SYSTEM AND METHOD FOR TARGET SIGNATURE CALCULATION AND RECOGNITION

(75) Inventors: Richard A. Lodwig, Gaithersburg, MD (US); Sandra Lodwig, legal representative, Frederick, MD (US); Richard Lodwig, legal representative, Leesburg, VA (US); Bonnie L. Adams, Gaithersburg, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 2729 days.

(21) Appl. No.: 10/388,237

(22) Filed: Mar. 14, 2003
(Under 37 CFR 1.47)

(65) Prior Publication Data
US 2011/0210885 A1    Sep. 1, 2011

Related U.S. Application Data

(60) Provisional application No. 60/364,030, filed on Mar. 15, 2002.

(51) Int. Cl.
*G01S 13/00*    (2006.01)
(52) U.S. Cl. .......... 342/59; 342/126; 342/148; 342/155; 342/175
(58) Field of Classification Search .......... 342/59, 342/126, 148, 149, 155, 175
See application file for complete search history.

(56) References Cited

U.S. PATENT DOCUMENTS

| | | | | |
|---|---|---|---|---|
| 2,539,905 | A | * | 1/1951 | Herbst .......... 244/183 |
| 4,415,898 | A | * | 11/1983 | Gaunaurd et al. .......... 342/192 |
| 5,252,980 | A | * | 10/1993 | Gray et al. .......... 342/59 |
| 5,448,243 | A | * | 9/1995 | Bethke et al. .......... 342/59 |
| 5,539,411 | A | * | 7/1996 | Yu et al. .......... 342/173 |
| 6,184,981 | B1 | * | 2/2001 | Hasson et al. .......... 356/303 |
| 6,424,290 | B1 | * | 7/2002 | O'Neil et al. .......... 342/55 |
| 6,580,388 | B1 | * | 6/2003 | Stoyanov et al. .......... 342/192 |

FOREIGN PATENT DOCUMENTS

| | | |
|---|---|---|
| EP | 0 634 669 A1 | 1/1995 |
| WO | WO 01/84181 A2 | 11/2001 |

OTHER PUBLICATIONS

International Search Report dated Oct. 10, 2003, for Application No. PCT/US03/07846.
Baniak, Jonathan et al, "Silent Sentry™ Passive Surveillance," reviewed online on Jul. 6, 1999, pp. 1-12, available at http://www.dtic.mil/ndia/jaws/sentry.pdf.
Wu, Youg et al., "Multistatic Synthetic Aperture Imaging of Aircraft using Reflected Television Signals," Proceedings of the SPIE, vol. 4382, Apr. 16, 2001, pp. 1-12.
Ogrodnik, Robert F. et al, "Bistatic Laptop Radar: An Affordable, Silent Radar Alternative," Proceedings of the IEEE 1996 National Radar Conference, May 13, 1996, pp. 369-373.
Lanterman, Aaron D., "Tracking and recognition of airborne targets via commercial television and FM radio signals," vol. 3692, 1999, pp. 189-198.

* cited by examiner

*Primary Examiner* — Timothy A Brainard
(74) *Attorney, Agent, or Firm* — Marsh Fischmann & Breyfogle LLP

(57) ABSTRACT

The present invention is directed to a system and method for the identification of a target object in PCL radar applications. The disclosed embodiments describe the systems and methods used in the identification of a target object from the collection of data representing specific target object features, such as velocity, altitude, fuselage length, wing length, or wing sweepback angle, and the comparison of selected target object features with a database of known aircraft features. The present invention also provides for the calculation of feature dimensions, such as the fuselage length, wing length, or wing sweepback angle from measurements associated with a peak signal lobe as a function of a bistatic aspect angle.

43 Claims, 7 Drawing Sheets

SYSTEM AND METHOD FOR TARGET SIGNATURE CALCULATION AND RECOGNITION

CROSS REFERENCE TO RELATED APPLICATIONS

This application claims benefit of U.S. Provisional Application No. 60/364,030 entitled "SYSTEM AND METHOD FOR TARGET SIGNATURE CALCULATION AND RECOGNITION" and filed Mar. 15, 2002, which is hereby incorporated by reference.

BACKGROUND OF THE INVENTION

1. Field of the Invention

The present invention relates to the detection, tracking and recognition of a target object, and more particularly, to a system and method for calculating a signature for recognition of a target object.

2. Discussion of the Related Art

The detection and tracking of a target object is typically accomplished with radio detection and ranging, commonly known as radar. Radar systems typically emit electromagnetic energy and detect the reflection of that energy scattered by a target object. By analyzing the time difference of arrival, Doppler shift, and various other changes in the reflected energy, the location and movement of the target object can be calculated.

Due to various advantages, microwaves are primarily used in modern radar systems. Microwaves are particularly well suited for radar due to their lobe size. Beamwidths of a microwave signal may be on the order of 1 degree, with wavelengths of only a few centimeters.

Radar systems for target detection and tracking are typically monostatic, meaning the radar has both the receiver and transmitter at the same location. A pulse based radar system scans a field of view and emits timed pulses of energy; therefore, a window exists between each scan and pulse where there is no signal and no ability to determine the existence or location of a particular object. The inability to continually track a target object raises the chance that a tracking system will generate inconsistent information among each sampling of data. The inclusion of scanning mechanisms and high-energy RF power transmission also tend to increase the cost of construction and operation of a radar system.

In addition to the ability to detect and track a target object, additional information, such as the identification of the target object, or identifying information, known as the signature of the target object, may also be useful in various environments. For example, during military operations, the determination of an object as friendly or foe is of great importance.

Various technologies, such as Jet Engine Modulation (JEM) and Inverse Synthetic Aperture Radar (ISAR) have had some success in creating useful signatures for target objects. JEM is the detection of the signal modulation created by the reflection of the radar beam off the moving parts of the jet engine. This technique is useful only when the target object is at an aspect angle that allows this phenomenon to be detected. ISAR creates a two-dimensional map of the target object by using a large bandwidth transmitted signal.

As discussed earlier, a target illuminated by a microwave, monostatic radar has a large number of narrow lobes. These lobes are influenced and scattered by the detailed structures of the target object. The scattering of the lobes limits the amount of energy reflected back to the radar's receiving antenna. Whether using JEM, ISAR, or some other signaturing method, at microwave frequencies, current signaturing systems must calculate and process large numbers of narrow, weak lobes of electromagnetic energy influenced by the fine details of a target object. These calculations will typically be done at intervals that allow for substantial movement of the target object between each calculation, adding significant complexity to the determination of the identity of the target object.

These and other deficiencies exist in current object recognition systems. Therefore, a solution to these problems is needed, providing an improved object recognition system specifically designed to more simply and accurately identify signature features of a target object.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof, as well as the appended drawings.

SUMMARY OF THE INVENTION

Accordingly, the present invention is directed to a target object signature calculation and recognition system and method.

PCL ("passive coherent location") technology has the ability to detect and accurately track a large number of objects over a significant spatial volume because it operates as a bistatic or multistatic system with a purview of all objects within the antenna's range and over a large angular region. In addition, PCL operates by using Continuous Wave (CW) TV or FM transmitter sources, typically in the 30 MHz to 300 MHz frequency range. Thus, the required radio frequency ("RF") energy is always present on the target(s) and the positions of the targets may be updated at a very high rate.

PCL technology also has inherently high velocity accuracy and resolution because of the CW nature of the transmitters. Furthermore, PCL measures velocity directly, as opposed to deriving the measurement as is done with traditional radar. This characteristic is very useful in separating multiple objects being tracked and is done in a fundamentally different manner than conventional radar performs the task.

PCL permits the detection, location, and tracking of various targets, including aircraft, space launch vehicles, and missiles, in a totally passive and covert fashion. Although radar-like in function, PCL does not require the radiation of any RF energy of its own, nor does it require a target to be radiating any RF energy in order for it to be detected and tracked. For this reason, PCL is particularly applicable where the attributes of covertness permit one to create a surveillance function even in hostile territory.

In addition to its covertness aspects, use of PCL can provide enhanced detectability of targets because of the extremely high energy of the signals used by the concept. In some cases, inherent sensitivities of up to 2 orders of magnitude greater than radar are possible. Furthermore, there is no scanning mechanism necessary in PCL. For this reason, target updates are not slaved to the mechanical rotation of antennas or intermittent pulses, and all targets may be updated as rapidly as desired. Real-time systems have been built with update rates of 6 per second for all targets within the system purview. Cost of a PCL system tends to be low when compared with that of a radar system, and reliability is high because of the lack of need for any scanning or high-energy RF power transmission.

The inherent ability of PCL to provide simultaneous high-quality tracking of multiple objects within a large volume of space is a departure from the method which radar uses for object tracking. With radar, the typical radar system revisits a multiplicity of objects sequentially by a scanning beam in order to maintain track on the objects. In PCL, the receiver beams are created and processed simultaneously in order to provide wide angular coverage.

In addition to the abilities of PCL to detect and track target objects, the frequencies used in a PCL system allow for the calculation of significant structural surfaces of a target object for use as signaturing information. For example, at a frequency of 100 MHz, features smaller than ⅓ wavelength (1 meter) in principal dimension may not efficiently scatter the signal because they are in the Raleigh region. Surface structural features smaller than ¹⁄₁₆ wavelength (18 cm) will not be perceived. Under such conditions, an aircraft may be approximated as a cylindrical fuselage and wings that are flat planar metallic sheets. Considering these approximations, the magnitude of the scattering in or near the yaw plane of the aircraft may be represented by relatively simple closed form mathematical expressions. Inverting these simple mathematical functions allows data from VHF signals reflected by an aircraft to be analyzed to estimate dimensions of the significant structures of an aircraft.

Under typical PCL use, many transmitters are exploited simultaneously. Using multiple transmitters increases the accuracy of the signature data due to the ability to compare and correlate the measurements across the transmitters. Comparing the data to a best mathematical representation of an expected signal return for a calculated wavelength may also be used to filter the signal returns of the target object for increased accuracy.

To identify a target object, the PCL system compares one or more features of a target object with a database of known aircraft features. The target object features used in the comparison may be one or more of the calculated dimensions of the target object, the velocity of the target object, the altitude of the target object, or any other feature discernable by the PCL system. The known aircraft features database provides a loosely populated decision space for the features calculated with the PCL system allowing for an accurate identification of a target object. For these reasons, PCL is well suited for detecting and identifying target objects.

Thus, according to an embodiment of the present invention, a system for detecting and identifying a target object using signals transmitted by one or more independent transmitters is disclosed. The system includes an antenna for receiving direct signals from the transmitters and reflected signals reflected by the target object. The system also includes a signal processing subsystem connected to the antenna for processing the signals received by the antenna. The system also includes a signature processing subsystem for calculating target object signature information. The system also includes a display subsystem for selectively displaying the target object signature information.

According to another embodiment of the present invention, a system for detecting and identifying a target object is disclosed. The system includes one or more transmitters for transmitting signals. The system also includes an antenna for receiving direct signals from the transmitters and reflected signals reflected by the target object. The system also includes a signal processing subsystem connected to the antenna for processing the signals received by the antenna. The system also includes a signature processing subsystem for calculating target object signature information using a reflected signal's amplitude as a function of a bistatic aspect angle. The system also includes a display subsystem for selectively displaying the target object signature information.

According to another embodiment of the present invention, a method for detecting and identifying a target object using signals transmitted by one or more transmitters is disclosed. The method includes detecting a transmitted signal from the one or more independent transmitters. The method also includes detecting the transmitted signal reflected by a target object. The method also includes calculating the wavelength of the reflected signal. The method also includes calculating an included angle. The method also includes calculating a bisector aspect angle. The method also includes calculating the length of a target object feature based on the wavelength as a function of the bisector aspect angle.

According to a further embodiment of the present invention, a method for detecting and identifying a target object using signals transmitted by one or more transmitters is disclosed. The method includes detecting a transmitted signal from the one or more independent transmitters. The method also includes detecting the transmitted signal reflected by a target object. The method also includes calculating a wavelength of the reflected signal. The method also includes calculating a heading change angle. The method also includes calculating the length of a target object feature based on the wavelength and the heading change angle.

According to another embodiment, a system for identifying a target object using signals from one or more transmitters is disclosed. The system includes a signal processing unit for calculating data representing specific features of a target object, including calculating a feature dimension of the target object using a received peak lobe as a function of a bistatic aspect angle and a heading change between −3 dB points of the received peak lobe. The system also includes a display element for displaying identification data associated with the target object.

According to a further embodiment, a method for identifying a target object is disclosed. The method includes detecting and tracking the target object, calculating signature data for the target object, and identifying the target.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof, as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to various embodiments of the present invention, examples of which are illustrated in the accompanying drawings.

Figure 1:
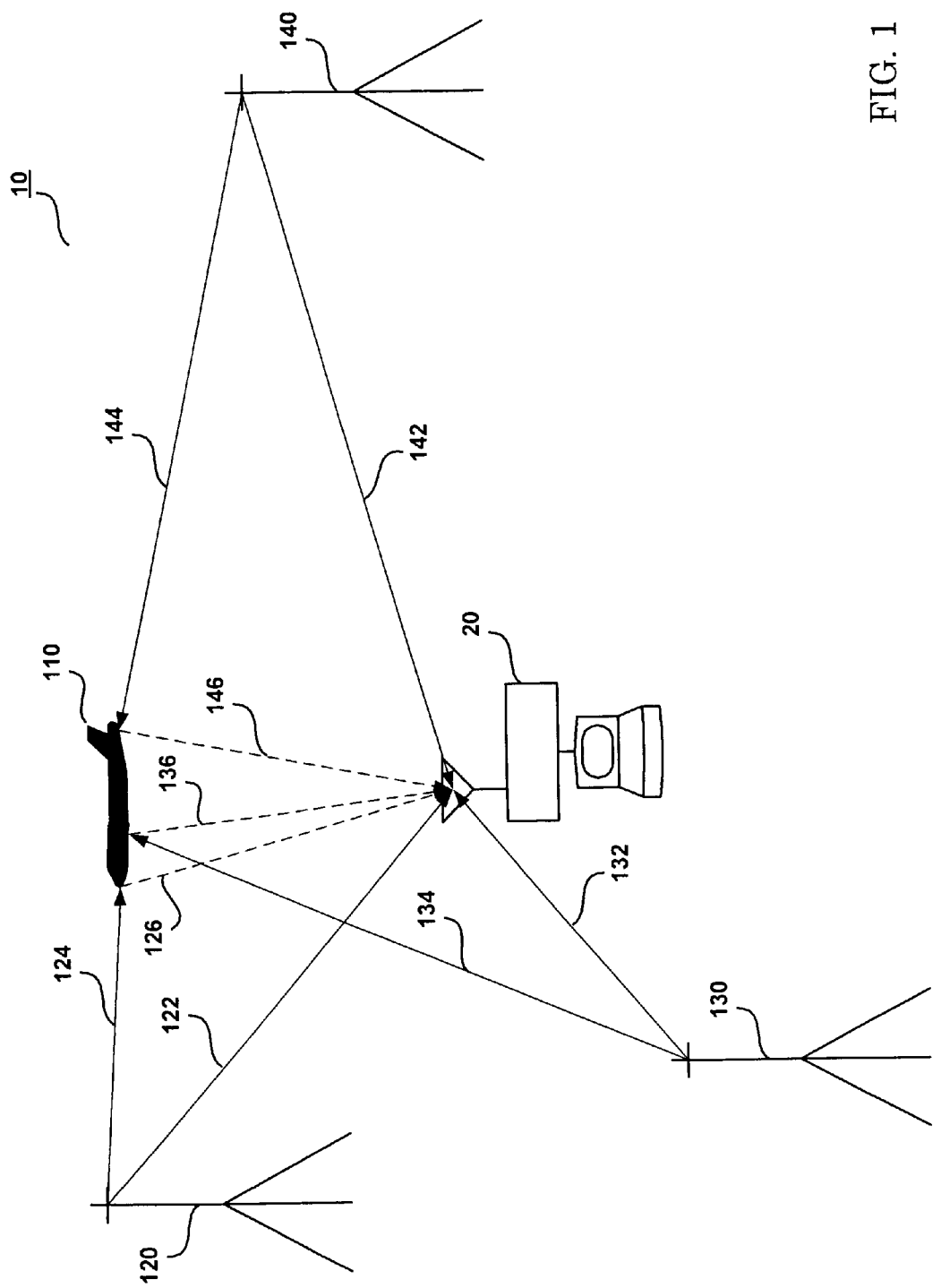
FIG. 1 illustrates a conventional target-tracking PCL configuration.

FIG. 1 illustrates a conventional PCL target-tracking configuration 10. This configuration 10 includes a PCL signal processing unit 20, a target object 110, and a plurality of transmitters 120, 130, and 140. Accordingly, the PCL signal processing unit 20 receives direct RF signals 122, 132, and 142 broadcast by transmitters 120, 130, and 140, as well as reflected RF signals 126, 136, and 146. The reflected RF signals 126, 136, and 146 are also broadcast by transmitters 120, 130, and 140 and are reflected by the target object 110.

In a typical target-tracking configuration, the PCL processing unit 20 calculates the time-difference-of-arrival (TDOA), frequency-difference-of-arrival (FDOA) (also known as the Doppler shift), and/or other information from the direct RF signals 122, 132, and 142 and the reflected RF signals 126, 136, and 146 to detect, and track the location of a target object 110.

Embodiments of the present invention use data generated with the use of PCL technology to calculate information sufficient to generate signaturing information for the target objects that it detects and tracks. For example, the accurate position and heading information computed by a PCL signal processing unit 20 allows for the computation of incident, reflected, and bisector angles at the target object. Embodiments of the present invention use these angles to locate peak signals and calculate various feature dimensions of an aircraft. Thus, the various embodiments of the present invention allow PCL technology to be used for the accurate and timely calculation and recognition of a target object.

According to an embodiment of the present invention a Passive Continuous Wave (CW) multistatic radar system 20 using Very High Frequency (VHF) signals is used to receive and process signals reflected by a target object 110. Information obtained from the processed signals allows for the calculation of identification information. VHF signals are typically in the 30 MHz to 300 MHz frequency range. Wavelengths at this frequency have generally been considered too long to permit high-resolution target analysis. The inherent bandwidth of these signals may also be small, typically 50 kHz to 75 kHz.

At a frequency of 100 MHz, features smaller than ⅓ wavelength (1 meter) in principal dimension may not efficiently scatter the signal because they are in the Raleigh region. Surface structural features smaller than 1/16 wavelength (18 cm) will not be perceived. Under such conditions, an aircraft may be approximated as a cylindrical fuselage and wings that are flat planar metallic sheets. Considering these approximations, the magnitude of the scattering in or near the yaw plane of the aircraft may be represented by relatively simple closed form mathematical expressions. Inverting these simple mathematical functions allows data from VHF signals reflected by an aircraft to be analyzed to estimate dimensions of the significant structures of an aircraft.

Figure 2:
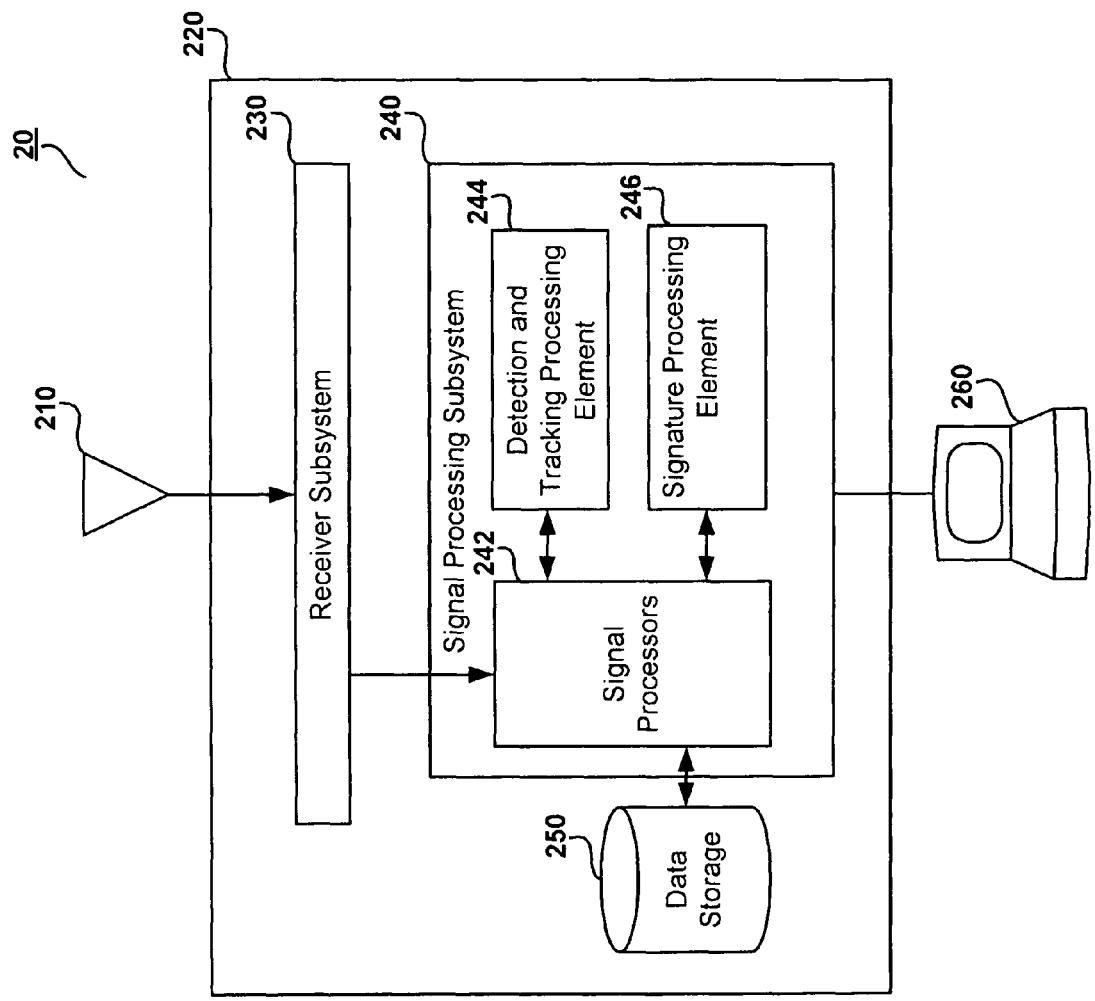
FIG. 2 illustrates a PCL signal processing unit, according to an embodiment of the present invention.

FIG. 2 illustrates a PCL signal processing unit, according to an embodiment of the present invention. The PCL signal processing unit 20 may be a single, or multiple, receiving and processing system, and contains an external antenna element 210 for the reception of the RF signals used in performing signature calculation functions. The PCL signal processing unit 20 also includes, a signal processing segment 220, and a display subsystem 260.

The antenna element 210, according to various embodiments of the present invention, may include a single antenna or multiple antennas. The antenna element 210 may also comprise target antennas and reference antennas. According to one embodiment, the reference antennas are used to receive the direct signals transmitted by the transmitters being exploited. According to a further embodiment, the target antennas are used to receive the reflected energy from the target objects that are being tracked by the PCL signal processing unit 20.

The signal processing segment 220 of the PCL signal processing unit 20 receives and processes the signals to determine the location and identity of the target objects. Further embodiments of the signal processing segment 220 include a receiver subsystem 230, a signal processing subsystem 240, and data storage 250.

The receiver subsystem 230 receives the signals transmitted by one or more transmitters and detected by the antenna element 210. According to an embodiment of the present invention, the receiver subsystem 230 is used to band limit, frequency shift, and amplify the received signals for use by the signal processing subsystem 240. According to further embodiments, the receiver subsystem 230 may include reference receivers for receiving the direct signals broadcast by the transmitters and target receivers for receiving the signals reflected by a target object.

The signal processing subsystem 240 receives the signal data from the receiver subsystem 230. The signal processing subsystem 240 performs the signal processing to extract detection, tracking, and signature components for target objects detected and tracked by the PCL processing unit 20. The signal processing subsystem 240 includes one or more signal processors 242, a detection and tracking processing element 244, and a signature processing element 246.

Various embodiments of the present invention provide signal processors 242 that may include narrowband signal processors, wideband signal processors, or both. In one embodiment of the present invention, narrowband signals are TV signals and wideband signals are FM signals. The signal processors 242 process the signal information received from the receiver subsystem 230 and calculate detection and tracking information in conjunction with the detection and tracking processing element 244. Detection and tracking information is calculated from the TDOA, FDOA, and/or other information derived from the direct and reflected of the signals received and exploited by the PCL signal processing unit 20. According to various embodiments of the present invention, the detection and tracking processing element 244 may comprise hardware, software, or a combination of hardware and software.

The signal processors 242 also calculate signature data in conjunction with the signature processing element 246. Position and heading data computed by the detection and tracking element 244 provides information used by the signature processing element 246 to calculate incident, reflected, and bisector angles associated with transmitter/target-object parings. Using the heading change necessary to pass through the −3 dB power points of a peak lobe associated with the bistatic aspect angle, the signature processing element 246 calculates the length of a structural feature of the target object associated with the peak lobe. According to one embodiment of the present invention, the signature processing element 246 is capable of calculating a target object's fuselage length, wing length, and the wing's sweepback angle. According to various embodiments of the present invention, the signature processing element 246 may comprise hardware, software, or a combination of hardware and software.

In further embodiments of the present invention, the signal processor 242 in conjunction with the signature processing element 246 may also filter data associated with a fuselage or wingspan peak lobe signal by calculating and applying a polynomial representation of the expected signal amplitude as a function of the bistatic aspect angle to the actual received peak lobe data. The polynomial representation is calculated from the mathematical representation for a signal reflected by a straight surface edge.

According to embodiments of the present invention, data representing specific features of an aircraft may be selected from the data calculated by the detection and tracking processing element 244 and/or the signature processing element 246. The selected data is compared to a library or database of known aircraft features located in the data storage device 250. The signal processing subsystem determines the identity of a target object by matching the selected data with data associated with a specific aircraft in the database.

The data storage device 250 stores the database of aircraft data and is accessed when a target object's data is ready for comparison with the database. According to the embodiment shown in FIG. 2 the data storage device 250 is connected to the signal processors 242. In further embodiments, the data storage device 250 may be placed in any other convenient location, such as within the signal processing subsystem, within the signature processing element 246, or externally connected to the signal processing segment 220.

The data storage device 250 may be volatile or non-volatile memory. Volatile memory may be random access memory, including main memory of the signal processing unit. Non-volatile memory may be a hard disk drive, a removable disk drive, read only memory, flash memory, or any other storage device capable of persistently storing data.

The display element 260 provides the means for displaying historical and current information associated with target objects, including the identification of the target objects when determined according to the present invention. Further embodiments also provide for the display of system status information, topographical information, PCL signal processing unit location, and transmitter locations.

In operation, embodiments of the present invention detect and track a target object, calculate structural dimensions, and identify target objects by comparing calculated features with a database of known information. The present invention detects a target object by receiving signals reflected by the target object. The present invention determines the position of the target object by analyzing the TDOA, FDOA, and/or other information derived from the direct and reflected signals.

As discussed previously, the present invention uses continuous wave transmitter sources; thus, the required radio frequency ("RF") energy is always present on the target object and the position of the target object may be updated at a very high rate. Using the position updates, the signal processing subsystem 240, and the detection and tracking processing element, in particular, are able to calculate the heading and the velocity of the target object.

According to embodiments of the present invention, the signal processing subsystem 240, and the signature processing element 246, in particular, calculate the structural features of the target object. Estimated dimensions of significant structures of a target object 110 are determined by calculating the measured reflected signal amplitude as a function of the bistatic aspect angle. The bistatic aspect angle is computed from the longitudinal axis of a target object and the bisector of the incident and reflected angles associated with an illuminator, a target object, and a PCL processing unit.

Figure 3:
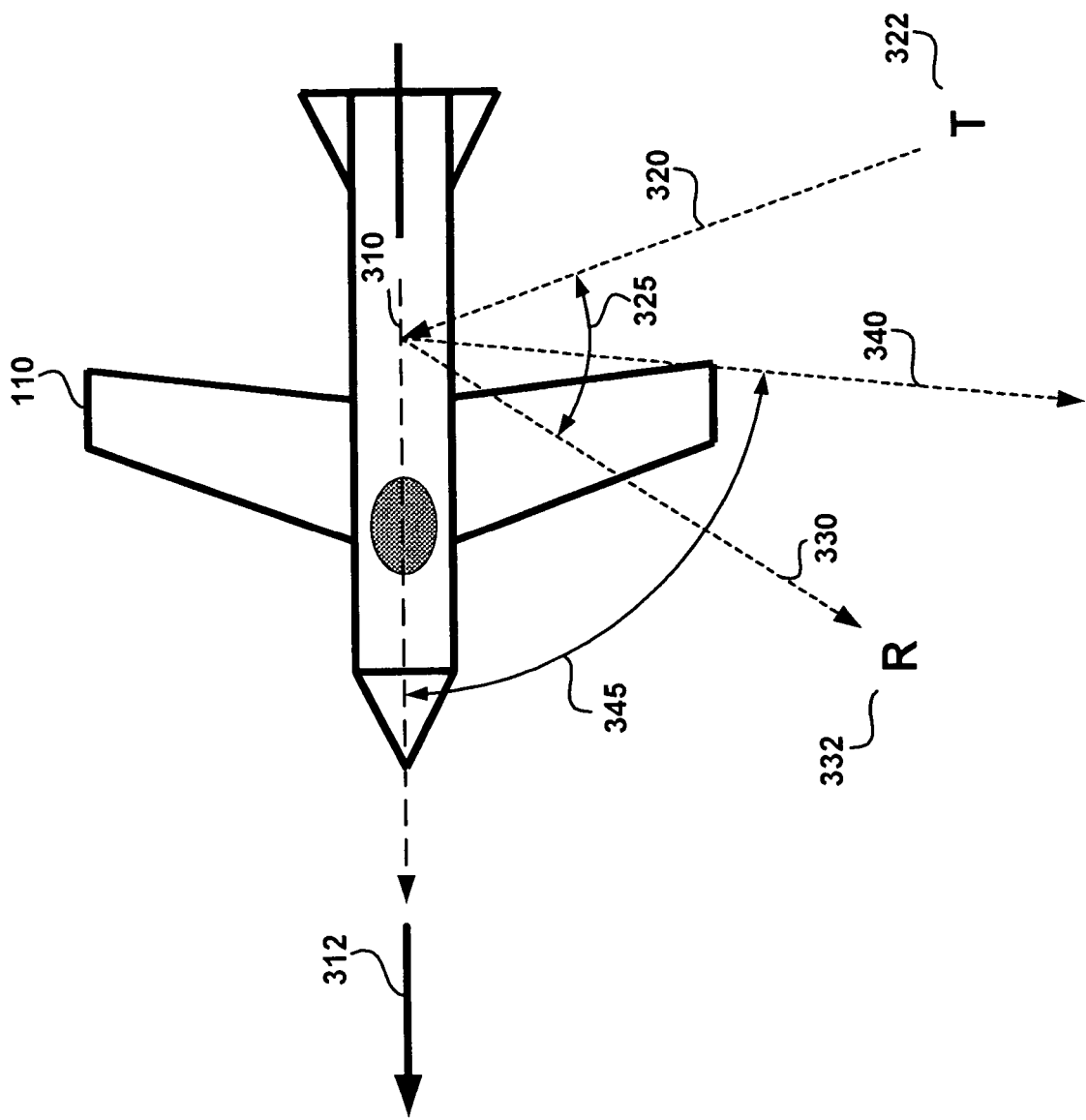
FIG. 3 illustrates a target object and the various axes and angles discussed in calculating signaturing measurements, according to an embodiment of the present invention.

FIG. 3 illustrates a target object 110 and the various axes and angles used by the signal processing subsystem 240 (shown in FIG. 2) and signature processing element 246 when calculating the bistatic aspect angle and signaturing measurements, according to embodiments of the present invention. As discussed previously, a PCL signal processing unit exploits the direct signals and their reflections from a target object 110 generated by transmitters. Using the direct signals and the reflected signals, the signal processing unit calculates a target object's position and heading, among other information, allowing for the calculation of a target object's longitudinal axis 310, as well as a velocity vector 312.

In a PCL configuration, the location of a transmitter 322 and the PCL receiver 332 are known. Obviously, once a target object 110 is detected and being tracked the target object's current position is also known and continually updated. From the known positions of the transmitter 322, PCL receiver 332, and target object 110, the transmitter to target object direction, known as the incident direction 320, and the target object to PCL system direction, known as the reflected direction 330, may be determined. The angle between the incident direction 320 and the reflected direction 330 is known as the included angle 325. From the incident direction 320 and the reflected direction 330, a bisector vector 340 of the included angle 325 may also be calculated.

As shown in FIG. 3, the bistatic aspect angle is the angle 345 between the bisector 340 of the included angle 325 and the longitudinal axis 310 of the target object 110. Once the bistatic aspect angle 345 is calculated, the reflected signal amplitude as a function of the bistatic aspect angle 345 is measured. This measurement is significant due to the expectation of a local region of high signal reflection near 90 degrees due to in phase coherent addition of the component reflections of the aircraft feature, such as the fuselage or wing, being measured.

Additionally, the bistatic aspect angle 345 is approximately equivalent to the monostatic aspect angle. In a further embodiment, a monostatic equivalent wavelength may be utilized, and the equivalent angle is computed by projecting the free space wave number onto the bisector vector.

Figure 4:
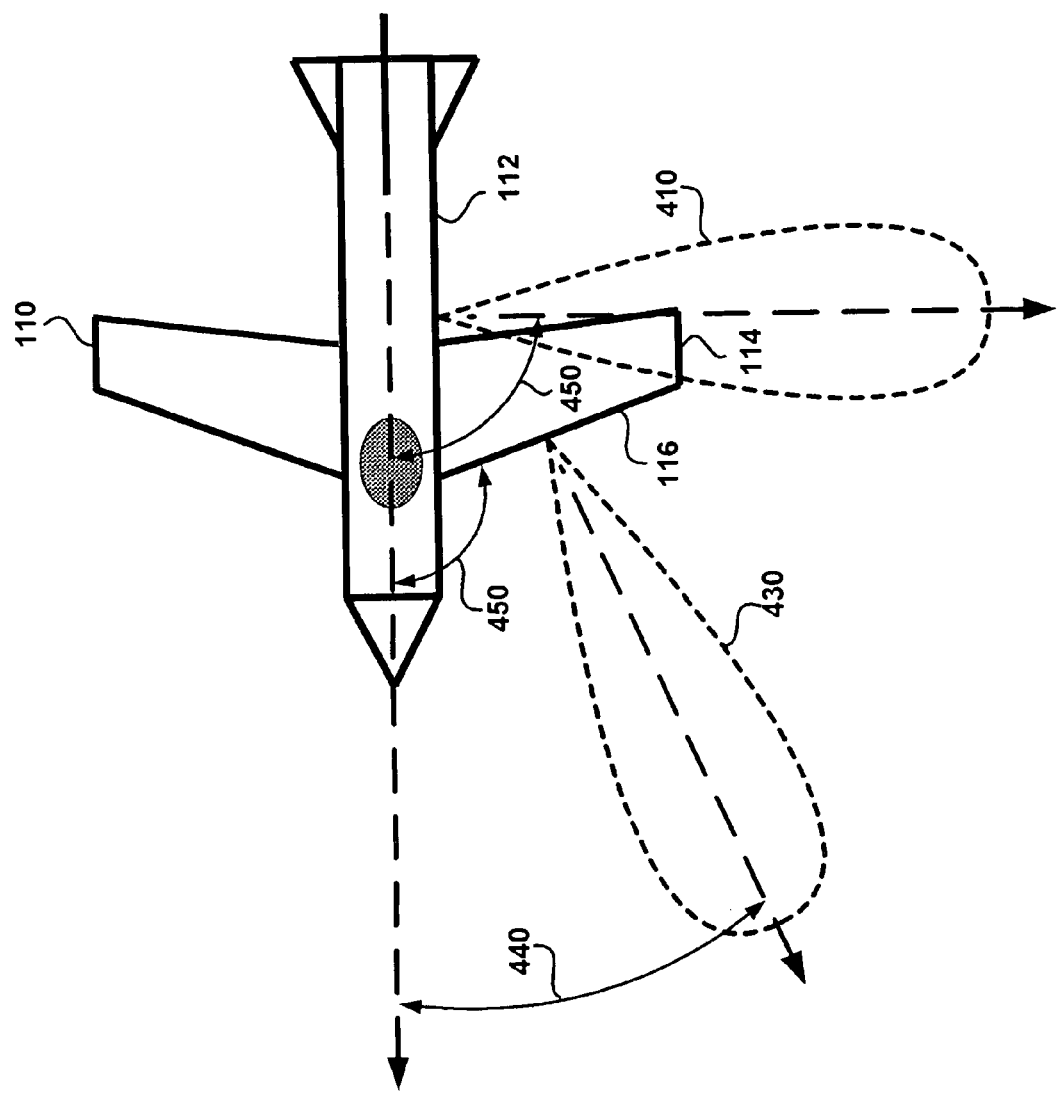
FIG. 4 illustrates a target object with a peak signal lobe reflected from the fuselage and a peak signal lobe reflected from leading edge of a wing.

FIG. 4 illustrates a target object 110 with a peak signal lobe 410 reflected from the fuselage 112 and a peak signal lobe 430 reflected from the leading edge 116 of the wing 114. The peak signal lobes 410 and 430 represent the local maximas reflected by the fuselage and wing respectively. As an example, in the region near the 90 degrees bistatic aspect angle of the fuselage 112 in an amplitude-bistatic aspect angle plot, one would expect a local region of high signal reflection, or local maxima, caused by the in-phase coherent addition of the component reflections of the fuselage 112. A local maxima is significant in this instance because it is typically discernable from other signals reflected and returned from the fuselage 112.

For example, the average reflected signal strength of a typical small aircraft (assumed to be 30 square meters in average radar cross section (RCS)) at 100 MHz is:

$$Pscatav = \frac{4\pi \cdot \sigma}{\lambda^2} = 41.9 = 16.2 \text{ dB}iS$$

The peak reflected signal strength in the region near 90 degrees may also be calculated by:

$$Pscatpk = \frac{4\pi \cdot Lf \cdot Df}{\lambda^2} \cdot \frac{2\pi \cdot Lf}{\lambda} = \frac{8\pi^2 \cdot Lf^2 \cdot Df}{\lambda^3}$$

Lf is the length of the fuselage,

Df is the diameter of the fuselage, and dBiS is decibels with respect to an isotropic scatterer.

The peak reflected signal strength of a target with a cylindrical fuselage of 20 meters in length and 2 meters in diameter at a frequency of 100 MHz is:

$$Pscatpk = \frac{8\pi^2 \cdot 20^2 \cdot 2}{3^3} = 2330 = 33.7 \text{ dB}iS$$

In the above example, the peak magnitude exceeds the average reflected signal strength by approximately 18 dB. Thus, the peak signal would be easily discernable in the signals returned from the target object.

Figure 5:
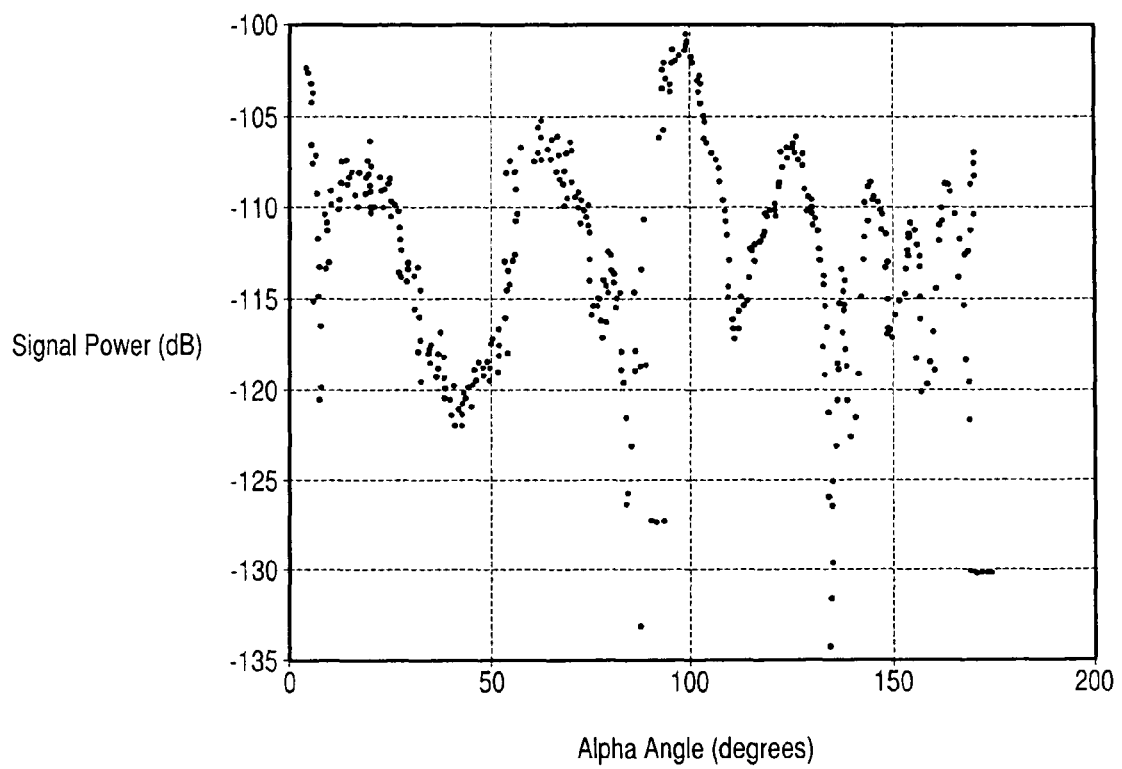
FIG. 5 illustrates a sample power as a function of bistatic aspect angle graph.

FIG. 5 provides sample, unprocessed measurements depicting signal power as a function of the bistatic aspect angle for a target object and a single illuminator. The data presented shows a peak heading at 98 degrees, with a 4.8 degree delta heading for a signal with a wavelength of 3.26 meters.

Once a peak signal is recognized, the dimensions of the fuselage may be calculated in the following manner. The expected local maxima of a beamwidth scattered by an aircraft fuselage feature is calculated by the traditional diffraction limited beamwidth expression. Assuming a uniformly illuminated and scattering right circular cylinder, the static beamwidth is given in radians by:

$$fBW = \frac{0.886 \cdot \lambda}{Lf}$$

where fBW is the full beamwidth.

The precise measurement of static fuselage scattering beamwidth of a moving target is obviously challenging. However, approximations can be made by taking into account various effects and variables. One embodiment of the present invention incorporates the mirror effect, in which a scattered beam, in earth reference space, rotates at twice the turn rate of the aircraft, and the amplitude doubling effect, in which a −3 dB net scattered signal arises from a −1.5 dB point on the scattered lobe from the incident vector and a −1.5 db scattered signal back to the receiver, to provide an effective manner in which to calculate the beamwidth. The resulting expression is:

$$beamwidth = \sin(2\theta) = \frac{0.638 \cdot \lambda}{Lf}$$

Inverting the expression permits the computation of the approximate fuselage length from the effective wavelength of the peak signal and the measured aircraft heading change needed to pass between the −3 dB power points on the scattered peak lobe as:

$$Lf = \frac{0.638 \cdot \lambda}{\sin(2\theta)}$$

Accordingly, the effective wavelength and heading change angle measurements provide the ability to calculate the structural dimension of the target object feature reflecting the peak lobe.

Using the data derived from the measurements in FIG. 5 as an example, namely, a 4.8 degree delta heading for a signal with an effective wavelength of 3.26 meters, a fuselage length of 12.47 meters is calculated as:

$$12.47 = \frac{0.638 \cdot 3.26}{\sin(2 \cdot 4.8)}$$

Returning to FIG. 4, because of the relatively long, flat surface of a wing's leading edge 116, the wing 114 also provides a wing peak lobe 430 in the same manner as the fuselage. Therefore, the wing's length may also be calculated in the same manner as the fuselage length. Furthermore, determination of the wing's bistatic aspect angle 440 allows for the computation of the wing's sweepback angle 450. It can also be appreciated that in some instances the entire wingspan may also be determined and measured according to embodiments of the present invention.

It can be appreciated that one or more illuminators may be used by the present invention in the collection and processing of signature data used in the identification of a target object. Multiple illuminators allow for the correlation of multiple measurements and the exclusion of clearly erroneous data, thereby narrowing the standard deviation of measurements, as well as reducing the time necessary for a target object to pass through the −3 dB points of a peak lobe. Furthermore, filtering based on mathematical representation or polynomial fit of the expected signal may also be performed.

Figure 6:
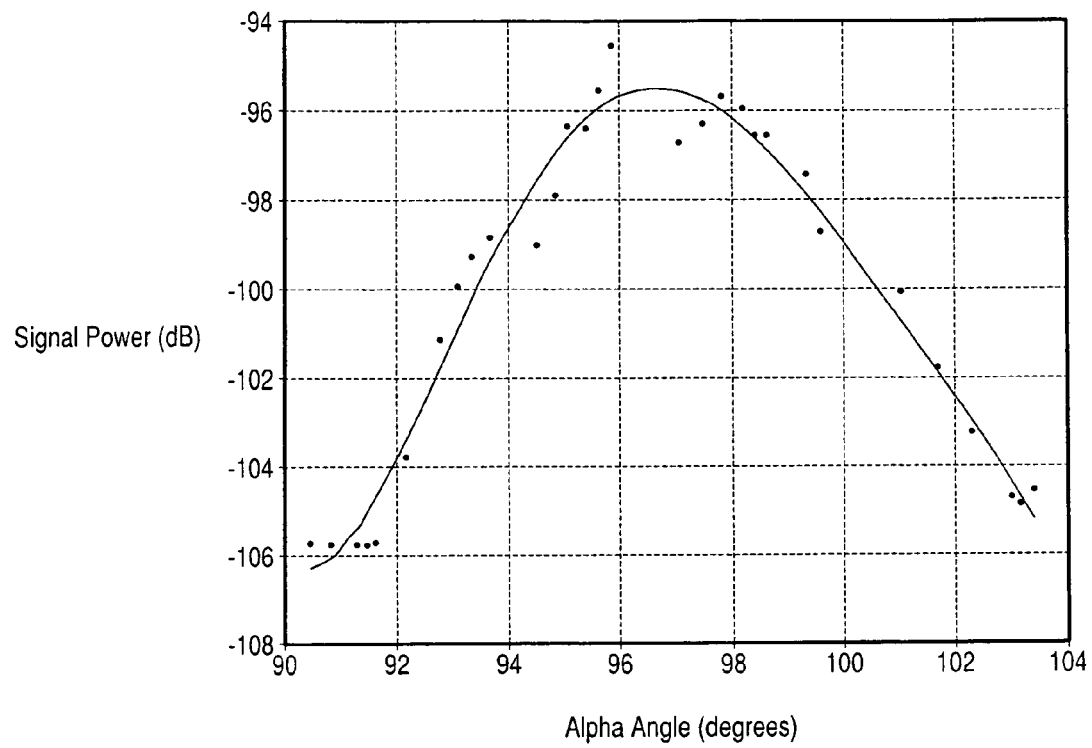
FIG. 6 illustrates a sample power as a function of bistatic aspect angle graph for a lobe maxima and a calculated polynomial fit to the lobe.

FIG. 6 illustrates a sample power as a function of bistatic aspect angle graph for a lobe maxima and a calculated polynomial fit to a peak lobe. The polynomial calculation provides a filtering mechanism based on the expected signal amplitude as a function of the bistatic aspect angle. The polynomial calculation is based on the equation for reflected energy for any straight edge and is provided as:

$$E(\theta) \equiv \frac{\text{Sin}(x)}{x}$$

According to embodiments of the present invention, a selection of various features of a target object that are determined during the detection and tracking of the target object, and calculation of structural dimensions, may be compared to a database of features for known aircraft. A target object is identified when the selected features match an entry of the database within a standard deviation. For example, according to an embodiment of the present invention, a features database of three-dimensions including fuselage length, wing length, and wing sweepback angle is used. The three-dimensions of this embodiment provide a loosely populated decision space. It can be appreciated that a features database of many dimensions may be created from aircraft data detailed in many publicly available reference sources.

Embodiments of the present invention are capable of measuring the wingspan and fuselage lengths to within 50 cm, and the sweep back angle to within 1 degree. It can be appreciated that within is three-dimensional decision space few, if any, of the world's aircraft would occupy the same decision points or even the standard deviations from those points.

It can also be appreciated that a target object may be identified with fewer than three measurements. Due to the angle of arrival of a target object to an area under observation, wing length and sweepback angle measurements tend to be made before a fuselage measurement is made. In most instances, embodiments of the present invention are able to accurately identify an aircraft with only these two measurements. It can be appreciated that in some instances a target object may be identifiable with a single feature measurement. In particular, those aircraft with unique features.

Furthermore, due to the configuration of "flying wing" type aircraft, a fuselage measurement will generally not be available from any angle. However, due to the limited numbers and the unique wing lengths and sweep back angles of these aircraft, they may be identified with only these two measurements. It may also be possible to identify these and other aircraft with only a single measurement.

Selection criteria of further embodiments of the present invention may also include such information as velocity, maneuverability, altitude, location, or various other data calculated by the present invention or input by an operator of the present invention. It can also be appreciated that a database of 4 or more dimensions provides the ability to enhance the accuracy of the present invention. A multi-dimensional database may also allow the present invention to use data from multiple transmitters and apply only the feature measurements that correlate among the transmitters, ignoring inconsistent or deafly excludable data.

Further embodiments of the present invention provide a method of calculating signature data and identifying a target object.

Figure 7:
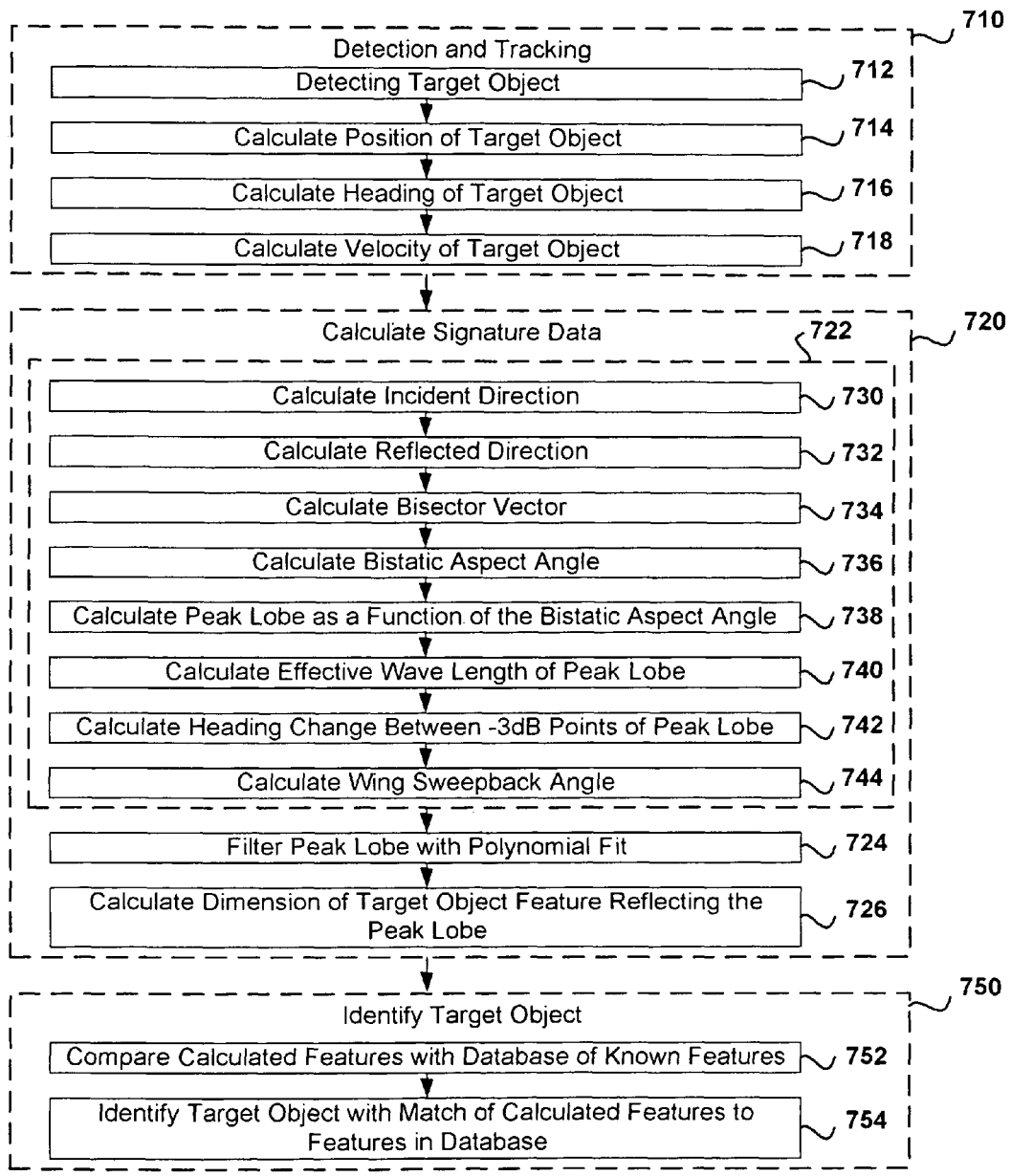
FIG. 7 illustrates a flow diagram providing the steps of calculating signature information and identifying a target object, according to an embodiment of the present invention.

FIG. 7 illustrates a signal processing flow diagram 700 providing the steps of calculating signature information and identifying a target object, according to an embodiment of the present invention. Data processing according to various embodiments of the present invention allows for the continual monitoring of a target object, as well as the collection of signature data and the identification of the target object. Thus, data processing may be divided into various processing segments including a detection and tracking step 710, a calculation of signature data step 720, and an identification of a target object step 750.

Signal processing, according to embodiments of the present invention, begins with the detection and tracking step 710. The detection and tracking step 710 is accomplished by monitoring the direct and reflected signals from one or more illuminators and begins in the detecting a target object step 712 when reflected signals are detected from a target object.

Once a target object is detected, the position of the target object is calculated in the calculate position of the target object step 714. The position of the target object may be updated multiple times per second. From the continual update of position data in step 714, the target object's heading information is calculated in the calculate heading of target object step 716 by comparing changes to the target object's direction over a period of time and the target object's velocity is calculated in the calculate velocity of target object step 718 by comparing the distance traveled by the target object with respect to time.

While a target object is tracked, additional signature information may be calculated in the calculate signature data step 720. Calculate signature data step 720 includes a calculating a peak lobe data step 722, an optional filtering of the peak lobe measurement step 724, and calculating dimension information step 726.

The calculating a peak lobe step 722 calculates the data associated with a peak lobe necessary for the calculation of the dimensions of structural features such as the wing and fuselage of the target object and may also include calculations for the wing sweepback angle. The calculating a peak lobe step 722 includes calculating an incident direction step 730, calculating a reflected direction step 732, calculating a bisector vector step 734, calculating a bistatic aspect angle step 736, calculating a signal amplitude for a peak lobe as a function of the bistatic aspect angle step 738, calculating the effective wavelength step 740, and calculating a heading change step 742. Further embodiments may also include a calculating the wing sweepback angle step 744.

The calculate incident direction step 730 provides the direction of the signal path from the signal transmitter to the target object. The calculate reflected direction step 732 provides the direction of the reflected signal path from the target object to the receiver. The calculate bisector vector step 734 provides the bisector of the included angle between the incident direction and the reflected direction. A bistatic aspect angle is calculated in step 736 by measuring the angle between the target object's heading and the bisector vector. The peak lobe associated with the bistatic aspect angle is then calculated in the calculate peak lobe as a function of the bistatic aspect angle step 738.

The heading change between the −3 dB power points of the peak lobe are calculated in the calculate heading change step 742. And the effective wavelength of the signal creating the peak lobe is also measured in the measure effective wavelength step 740. According to the algorithms discussed above, the length of a target object feature may be calculated in the calculate feature dimension step 726 by multiplying the effective wavelength measurement made in the measure wavelength step 740 by a constant value and dividing the result by the sine of twice the heading change calculation made in the calculate heading change step 742. As discussed above, the constant value is derived from the traditional diffraction limited beamwidth expression and may account for the mirror effect, the amplitude doubling effect, or other associated phenomena.

Further embodiments of the present invention include filtering of peak lobe data with a polynomial fit in the filter peak lobe step 724. Filtering with a polynomial fit provides for the comparison of the peak lobe data with a mathematical representation of the expected peak lobe. This comparison allows for the removal of noise in the received peak signal data.

A further embodiment of the present invention also calculates the wing sweepback angle in the calculate wing sweepback angle step 744. For example, the bisector vector of the wing is approximately 90 degrees to the wing's leading edge;

therefore, in one embodiment, a simple estimate of the wing's sweepback angle may be calculated by adding ninety degrees to the bistatic aspect angle. The wing sweepback angle provides an additional feature with which to compare with the features database for identifying a target object. In most instances, the sweepback angle and wing length are sufficient to provide the identity of a target object.

From data calculated during the detection and tracking step 710 and the calculate signature data step 720 the identity of a target object may be determined in the identify target object step 750. In step 750, features calculated from the target object are compared to a database of known aircraft data in the comparison step 752. A target object is identified when a match is found in the identify target object step 754. Target object data is considered to be a match when it comes within a predetermined standard deviation for the measurements used in the database.

After a target object has been identified, the identity of the target object may also be displayed or provided to other processes or systems for use.

It will be apparent to those skilled in the art that various modifications and variations can be made in the present invention without departing from the spirit or scope of the invention. Thus, it is intended that the present invention cover the modifications and variations of this invention provided that they come within the scope of any claims and their equivalents.

The invention claimed is:

1. A system for detecting and identifying a target object using signals transmitted by one or more independent transmitters, comprising:
    an antenna for receiving direct signals from the transmitters and reflected signals reflected by the target object;
    a signal processing subsystem connected to the antenna for processing the signals received by the antenna;
    a signature processing subsystem for calculating target object signature information, wherein the signature processing subsystem calculates target object signature information by calculating peak lobe data from a peak lobe reflected by a target object feature and calculating the dimension of the target object feature from the peak lobe data; and
    a display subsystem for selectively displaying the target object signature information.

2. The system of claim 1, wherein the direct and reflected signals received by the antenna are in the 30 MHz to 300 MHz frequency range.

3. The system of claim 1, wherein the signature processing subsystem calculates the target object signature information using a reflected signal amplitude as a function of a bistatic aspect angle.

4. The system of claim 1, wherein the signature processing subsystem calculates an included angle.

5. The system of claim 1, wherein the signature processing subsystem calculates an aspect angle.

6. The system of claim 1, wherein the signature processing subsystem calculates the target object signature information using a monostatic equivalent wavelength.

7. The system of claim 1, wherein the signature processing subsystem approximates a reflected beam width by taking into account a mirror effect.

8. The system of claim 1, wherein the signature processing subsystem approximates a reflected beam width by taking into account an amplitude doubling effect.

9. The system of claim 1, further comprising a database of signature data for comparison with the target object signature information.

10. A system for detecting and identifying a target object, comprising:
    one or more transmitters for transmitting signals;
    an antenna for receiving direct signals from the transmitters and reflected signals reflected by the target object;
    a signal processing subsystem connected to the antenna for processing the signals received by the antenna;
    a signature processing subsystem for calculating target object signature information using a reflected signal amplitude as a function of a bistatic aspect angle, wherein the signature processing subsystem calculates a length of a target object feature by calculating a value by multiplying a wavelength of a reflected signal by a constant and dividing the value by the sine of twice a heading change angle; and
    a display subsystem for selectively displaying the target object signature information.

11. The system of claim 10, wherein the one or more transmitters transmit in the 30 MHz to 300 MHz frequency range.

12. The system of claim 10, wherein the signature processing subsystem calculates an included angle.

13. The system of claim 10, wherein the signature processing subsystem calculates an aspect angle.

14. The system of claim 10, wherein the signature processing subsystem calculates the target object signature information using a monostatic equivalent wavelength.

15. The system of claim 10, wherein the signature processing subsystem approximates a reflected beam width by taking into account a mirror effect.

16. The system of claim 10, wherein the signature processing subsystem approximates a reflected beam width by taking into account an amplitude doubling effect.

17. The system of claim 10, further comprising a database of signature data for comparison with the target object signature information.

18. A method for detecting and identifying a target object using signals transmitted by one or more transmitters, comprising the steps of:
    detecting a transmitted signal from the one or more independent transmitters;
    detecting the transmitted signal reflected by a target object;
    calculating the wavelength of the reflected signal;
    calculating an included angle;
    calculating a bisector aspect angle; and
    calculating the length of a target object feature based on the wavelength as a function of the bisector aspect angle.

19. The method of claim 18, wherein the step of calculating the length of the target object feature comprises the sub-steps of:
    calculating a value by multiplying the wavelength by a constant; and
    dividing the value by the sine of twice a heading change angle.

20. The method of claim 18, wherein the step of detecting a transmitted signal reflected by a target object further comprises the sub-step of detecting an average reflected signal.

21. The method of claim 18, wherein the step of detecting a transmitted signal reflected by a target object further comprises the sub-step of detecting a peak reflected signal.

22. A method for detecting and identifying a target object using signals transmitted by one or more transmitters, comprising the steps of:
    detecting a transmitted signal from the one or more independent transmitters;
    detecting the transmitted signal reflected by a target object;
    calculating a wavelength of the reflected signal;

calculating a heading change angle; and calculating the length of a target object feature based on the wavelength and the heading change angle.

23. A system for identifying a target object using signals from one or more transmitters, comprising:

a signal processing unit for calculating data representing specific features of a target object, including calculating a feature dimension of the target object using a received peak lobe as a function of a bistatic aspect angle and a heading change between −3 dB points of the received peak lobe; and a display element for displaying identification data associated with the target object.

24. The system of claim 23, further comprising a library of known aircraft data for comparing with the data calculated by the signal processing unit.

25. The system of claim 23, wherein the signal processing unit further comprises:

an antenna element for receiving the direct signals transmitted by the one or more transmitters and the reflected signals transmitted by the one or more transmitters, reflected by the target object, and received by the antenna element; and a signal processing segment for processing the direct signals and the reflected signals.

26. The system of claim 25, wherein the antenna element further comprises:

a reference antenna for receiving the direct signals; and a target antenna for receiving the reflected signals.

27. The system of claim 25, wherein the signal processing segment further comprises:

a receiver subsystem for receiving the signal received by the antenna element;

a signal processing subsystem; and a data storage element for storing a library of known aircraft data for comparing with the data calculated by the signal processing unit.

28. The system of claim 27, wherein the receiver subsystem further comprises a reference receiver for receiving the direct signals from the antenna element.

29. The system of claim 27, wherein the receiver subsystem further comprises a target receiver for receiving the reflected signals from the antenna element.

30. The system of claim 27, wherein the signal processing subsystem further comprises:

one or more signal processors; and a signature processing element associated with the one or more signal processors for calculating target object feature dimensions using the received peak lobe as a function of a bistatic aspect angle and the heading change between −3 dB points of the received peak lobe.

31. The system of claim 30, wherein the signature processing element further filters the received peak lobe with a polynomial representation of the expected signal amplitude as a function the bistatic aspect angle.

32. The system of claim 27, wherein the signal processing subsystem further comprises a detection and tracking processing element for detecting and calculating the location and movement of the target object.

33. The system of claim 27, wherein the one or more signal processors further comprise narrowband signal processors.

34. The system of claim 27, wherein the one or more signal processors further comprise one or more wideband signal processors.

35. A method for identifying a target object, comprising the steps of:

detecting and tracking the target object;

calculating signature data for the target object; and identifying the target;

wherein the step of calculating signature data further comprises the steps of:

calculating peak lobe data from a peak lobe reflected by a target object feature; and calculating the dimension of the target object feature from the peak lobe data.

36. The method of claim 35, wherein the step of detecting and tracking the target object further comprises the steps of:

detecting the target object by receiving direct signals and reflected signals reflected by the target object;

calculating the position of the target object with the direct and reflected signals;

calculating the heading of the target object by updating the position of the target object over a period of time; and calculating the velocity of the target object by comparing the distance traveled by the target object with respect to time.

37. The method of claim 35, further comprising the step of filtering the peak lobe with a polynomial fit representation of the expected peak lobe.

38. The method of claim 35, wherein the step of calculating peak lobe data further comprises the steps of:

calculating the incident direction of a signal path from a transmitter to the target object;

calculating the reflected direction of a reflected signal path from the target object to a receiver;

calculating the bisector vector of the included angle between the incident direction and the reflected direction;

calculating a bistatic aspect angle between the target object's heading and the bisector vector;

calculating a peak lobe as a function of the bistatic aspect angle;

calculating an effective wave length of the peak lobe signal;

calculating a heading change between −3 db power points of the peak lobe.

39. The method of claim 38, further comprising the step of calculating a wing sweepback angle.

40. The method of claim 39, wherein the step of calculating a wing sweepback angle further comprises the step of adding ninety degrees to the bistatic aspect angle of the peak lobe reflected by a wing of the target object.

41. The method of claim 38, wherein the step of calculating the dimension of the target object feature from the peak lobe data further comprises the steps of:

multiplying the effective wavelength with a constant value; and dividing by the sine of twice the heading change.

42. The method of claim 41, wherein the step of multiplying the effective wavelength with a constant value further comprises multiplying the wavelength by 0.638.

43. The method of claim 35, wherein the step of identifying the target object further comprises the steps of:

comparing calculated features of the target object with a database of known features; and identifying the target object with a match in the database of known features.

* * * * *